United States Patent [19]
Massarsky

[11] Patent Number: 5,109,242
[45] Date of Patent: Apr. 28, 1992

[54] AUTOMATIC FILM CHANGING SYSTEM
[75] Inventor: Yefim Massarsky, Newton, Mass.
[73] Assignee: Foto Fantasy, Inc., Newton, Mass.
[21] Appl. No.: 599,288
[22] Filed: Oct. 17, 1990
[51] Int. Cl.⁵ .............................................. G03B 29/00
[52] U.S. Cl. .................................... 354/75; 354/174; 354/290
[58] Field of Search ....................... 354/75, 76, 78, 81, 354/174, 175, 290; 355/40, 41, 27

[56] References Cited
U.S. PATENT DOCUMENTS 3,744,389 7/1973 Clark ..................... 354/86
3,744,390 7/1973 Clark ..................... 354/174

Primary Examiner—L. T. Hix
Assistant Examiner—Howard B. Blankenship
Attorney, Agent, or Firm—Iandiorio & Dingman

[57] ABSTRACT

An automatic film changing system for a camera-back which uses a film cassette, including a film magazine for storing a plurality of new cassettes of fresh film and presenting a fresh film cassette to replace a spent film cassette in the camera-back; a detector for detecting when the film cassette in the camera-back is spent; an accessing device, responsive to the detector, for enabling access to the film cassette in the camera-back when the cassette is spent; a cassette reloader, responsive to the detector, for ejecting a spent cassette from the camera-back and for loading a fresh cassette in the camera back from the film magazine; and a bifurcated dispensing path for normally directing finished photographs in one direction and periodically, selectively directing a spent cassette ejected from the camera-back in a second direction.

9 Claims, 11 Drawing Sheets

VIEW B

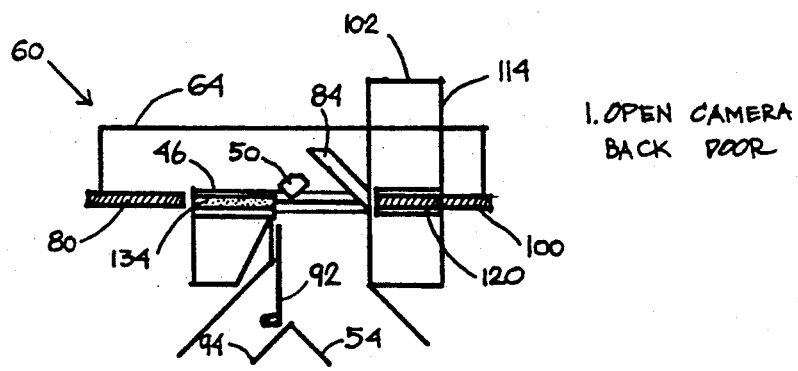
FIG-10    1. OPEN CAMERA BACK DOOR
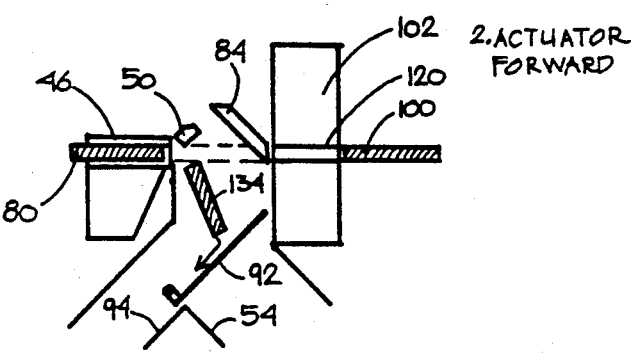
FIG-11    2. ACTUATOR FORWARD
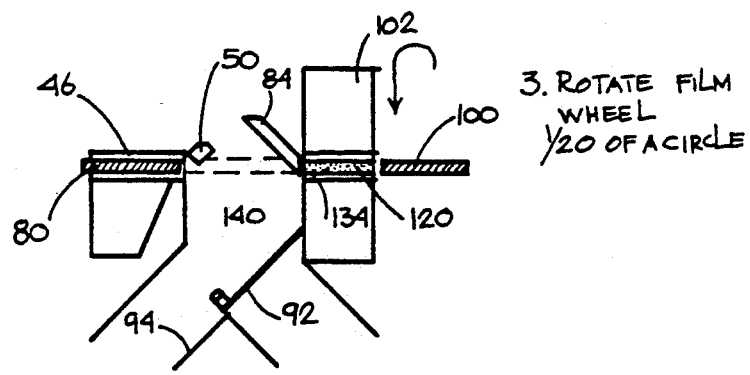
FIG-12    3. ROTATE FILM WHEEL 1/20 OF A CIRCLE
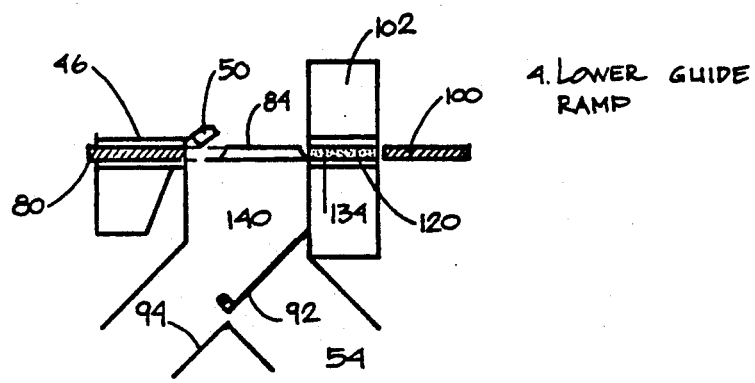
FIG-13    4. LOWER GUIDE RAMP

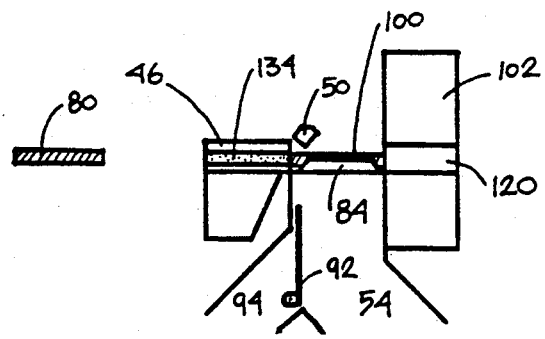
Fig-14    5. ACTUATOR FULL REAR
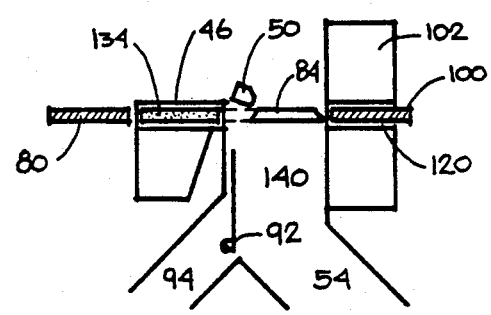
Fig-15    6. ACTUATOR NEUTRAL
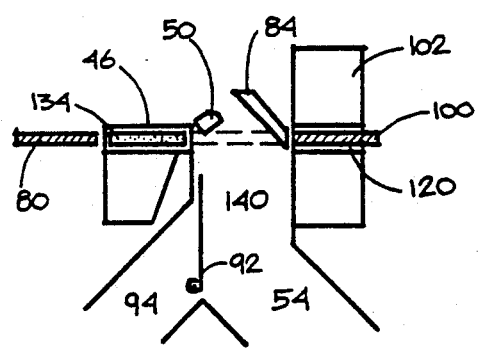
Fig-16    7. RAISE GUIDE RAMP
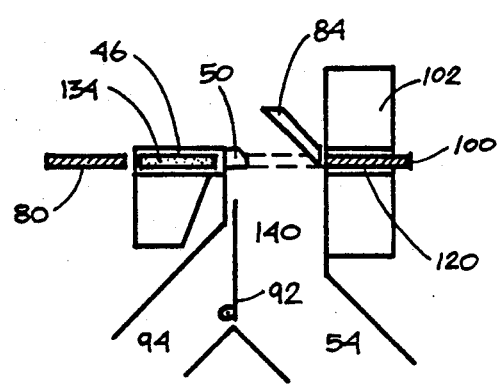
Fig-17    8. SEQUENCE IS COMPLETE

AUTOMATIC FILM CHANGING SYSTEM

FIELD OF INVENTION

This invention relates to an automatic film changing system which ejects spent cassettes and installs fresh cassettes automatically, and more particularly to such a system which selectively initially dispenses finished photographs and spent cassettes into the same passage.

BACKGROUND OF INVENTION

Polaroid freeze-frame equipment is widely used to capture a hard copy of an electronic image from a computer monitor or T.V. system. One problem with Polaroid freeze-frame equipment is that the number of hard copies or photographs produced is limited by the number of films in the film cassette. For example, a Polaroid film cassette contains only ten films, so that the equipment must be serviced after every ten operations. This is inconvenient, time consuming and expensive in any application, but is a particular problem in automatic apparatus such as automatic electronic (T.V.) photographic equipment, where a shutdown for cassette replacement after every ten photographs would require an on-site serviceman at every installation and would delay the servicing of customers, which would in turn severely reduce the number of customers that could be serviced and even discourage customers from using the service at all.

SUMMARY OF INVENTION

It is therefore an object of this invention to provide an improved automatic photograph system in which the empty film cassettes are automatically removed and replaced.

It is a further object of this invention to provide such an automatic system which permits the alternative ejection of spent film cassettes and developed photographs.

It is a further object of this invention to provide such an automatic system which produces photographs, ejects spent cassettes and installs new cassettes automatically without human intervention.

This invention features an automatic film changing system for a camera-back which uses a film cassette. There are means for opening the camera-back when the film cassette is spent. A film magazine stores a plurality of film cassettes of fresh film and presents a fresh film cassette when the film cassette in the camera-back is spent. A bifurcated dispensing path normally directs finished photographs in one direction and periodically selectively directs a spent cassette in a second direction. A cassette reloader means ejects the spent cassette from the camera-back and replaces it with a fresh cassette from the magazine.

In a preferred embodiment the means for opening includes means for detecting when the film cassette is spent and means responsive thereto for accessing the spent cassette. The film magazine may include a rotary housing with a plurality of circumferentially spaced cassette bays and means for indexing the rotary housing to replace an empty bay proximate the camera-back with a full bay. The bifurcated exit path may include a common conduit associated with the camera-back, and two exit conduits: a photo conduit for conducting finished photographs to the user, and a cassette conduit for discharging spent cassettes. The exit path may also include a steering element for selectively closing one of the exit conduits and opening the other.

The cassette reloader means may include a reloader actuator having an ejection element and a replacement element, as well as means for driving the actuator in a first direction during the ejection cycle to enable the ejection element to move a spent cassette out of the camera-back and into the bifurcated path, and in a second direction during the replacement cycle to enable a replacement element to move a fresh cassette out of the magazine and into the camera-back. The cassette reloader means may further include means for operating a steering element for momentarily opening the cassette conduit and closing the photo conduit during the ejection cycle and for restoring the steering element to close the cassette conduit and open the photo conduit during and after the replacement cycle.

The cassette reloader means may include cassette guide means for guiding a fresh cassette from the magazine to the camera-back. The guide means may be resiliently pivotably mounted proximate the magazine for normally remaining in a retracted position and for lowering into the extended position between the camera-back and the magazine under the force of the advancing fresh cassette replacement being driven from the magazine by the replacement element.

DISCLOSURE OF PREFERRED EMBODIMENT

Other objects, features and advantages will occur from the following description of a preferred embodiment and the accompanying drawings, in which:

FIGS. 10–17 are a depiction of the sequential operation of the automatic film system according to this invention from the exhausting of a film cassette through ejection and replacement with a fresh film cassette.

Figure 1:
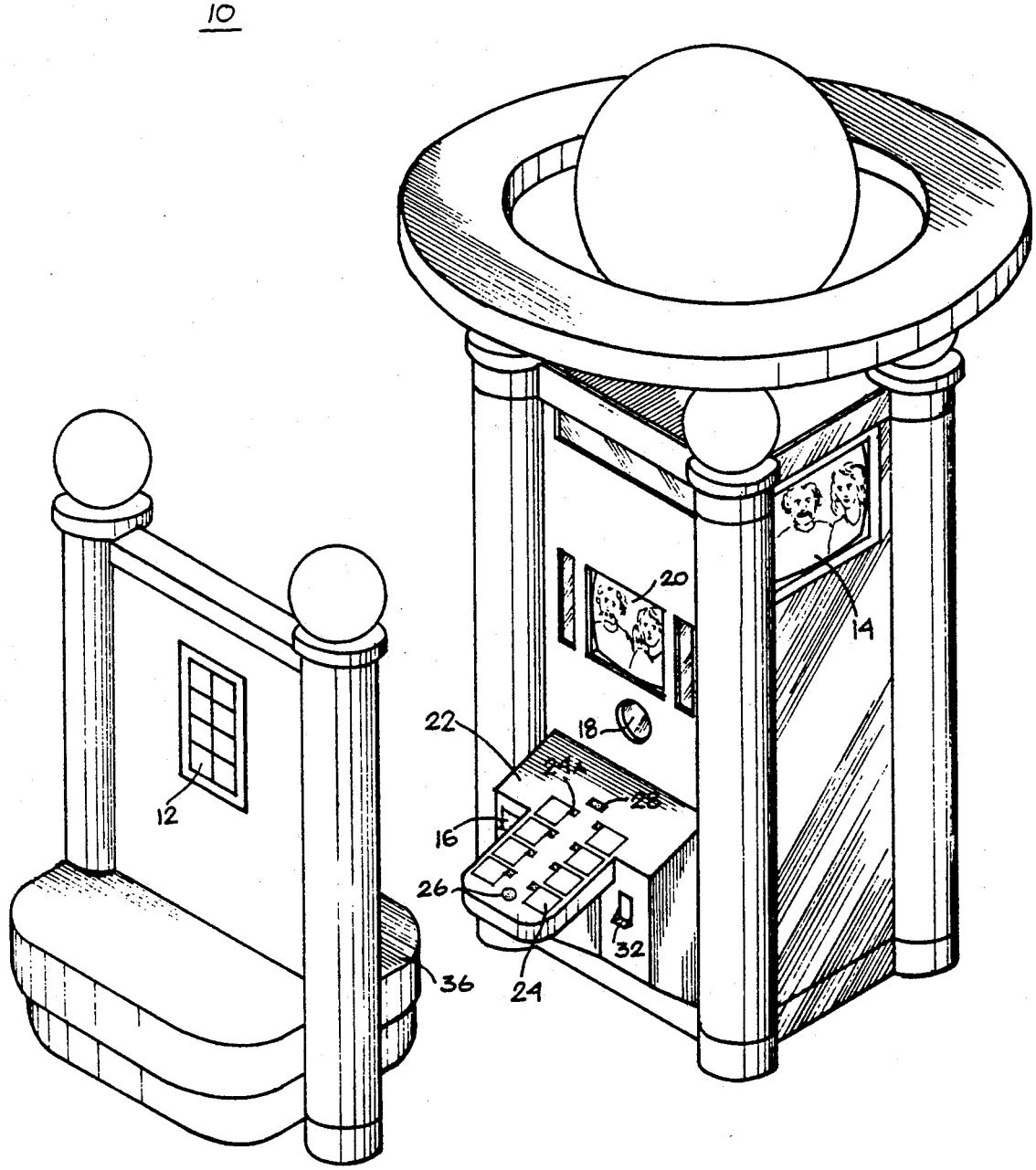
FIG. 1 is a perspective view of an automatic electronic photograph booth which may be made with the automatic film changing system of this invention.

There is shown in FIG. 1 an automatic electronic photo booth 10 utilizing the automatic film changing system of this invention. On the outside of the booth there are depicted multiple numbered background scenes 12 which a customer, by putting money into bill acceptor 32 and pressing buttons 24a, can cause to have displayed on trial monitor 14 in order to preliminarily select the background in which the customer wishes to have his or her image appear. There is also a tray 16 in which the finished photograph will appear. Tray 16 may be located inside the booth. Inside the booth there is a T.V. camera 18 which is aimed directly at the subject, and a monitor 20 in which the subject can see his own image as it is presently being sensed by T.V. camera 18. A control panel 22 permits the subject or customer to select any one of a number of scenes 24 to be superimpoesed with the customer's portrait. These scenes 24 with corresponding buttons 24a are the same as those depicted at 12 on the outside of booth 10. When the customer is satisfied with his portrait and the background, he simply strikes freeze button 26, whereupon the instant image is captured for his perusal. If the customer is satisfied with the freeze frame portrait, he need only touch button 28 to cause a photograph to be made of the video image that he sees. If he is unhappy with the freeze frame image he need only strike button 26 again to release the captured image and continue having the live scene of himself captured on monitor 20. A coin box 32 may be used to activate the machine.

Figure 2:
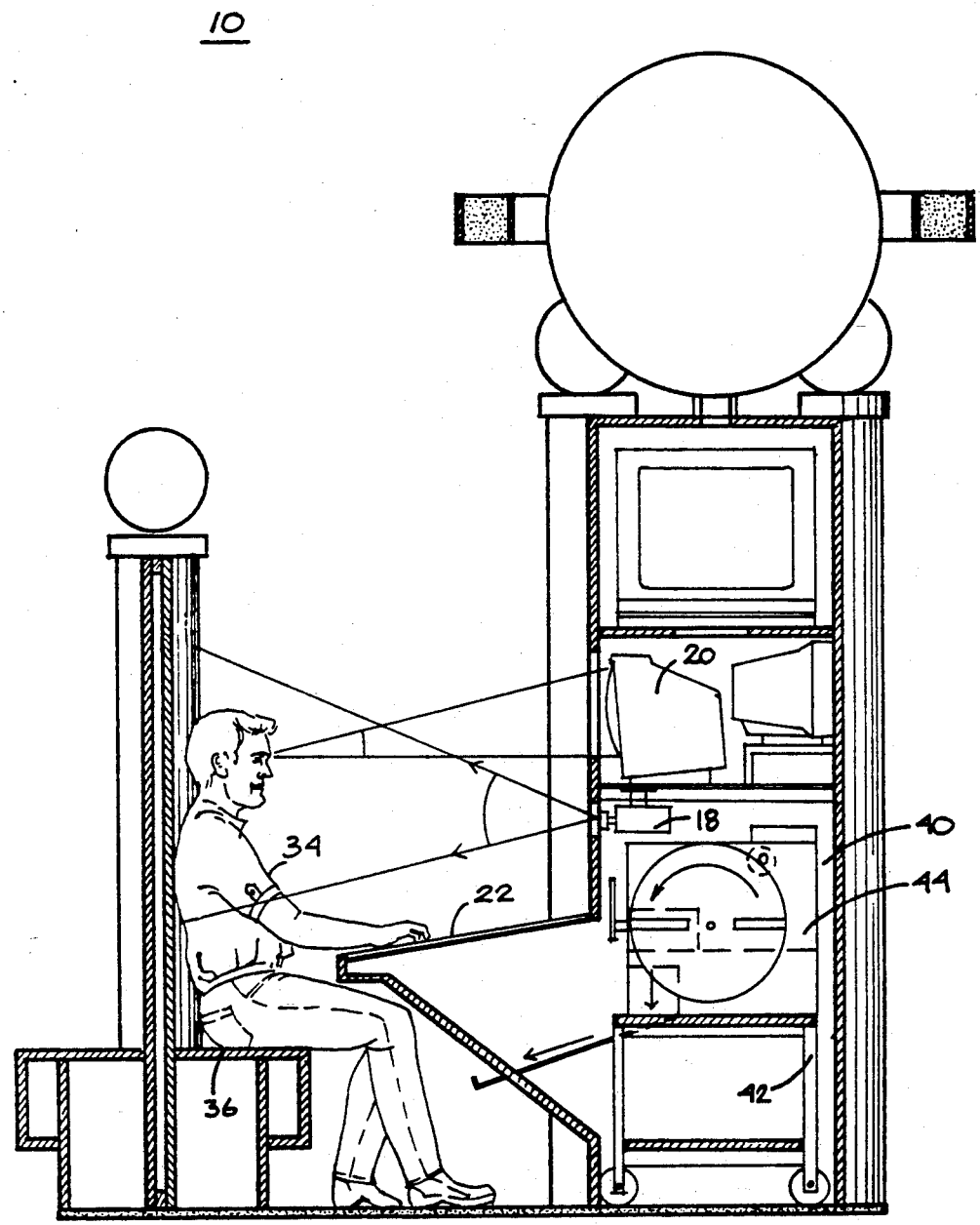
FIG. 2 is a side elevational schematic view of the booth of FIG. 1 showing in more detail the automatic film changing system of this invention.

The simplified sectional view, FIG. 2, of booth 10 shows the customer or subject 34 seated on a conventional adjustable height stool 36 operating console 22, with camera 18 and monitor 20 mounted above the automatic film changing system 40 according to this invention, which is mounted on a castered table 42 by means of frame 44.

Figure 3:
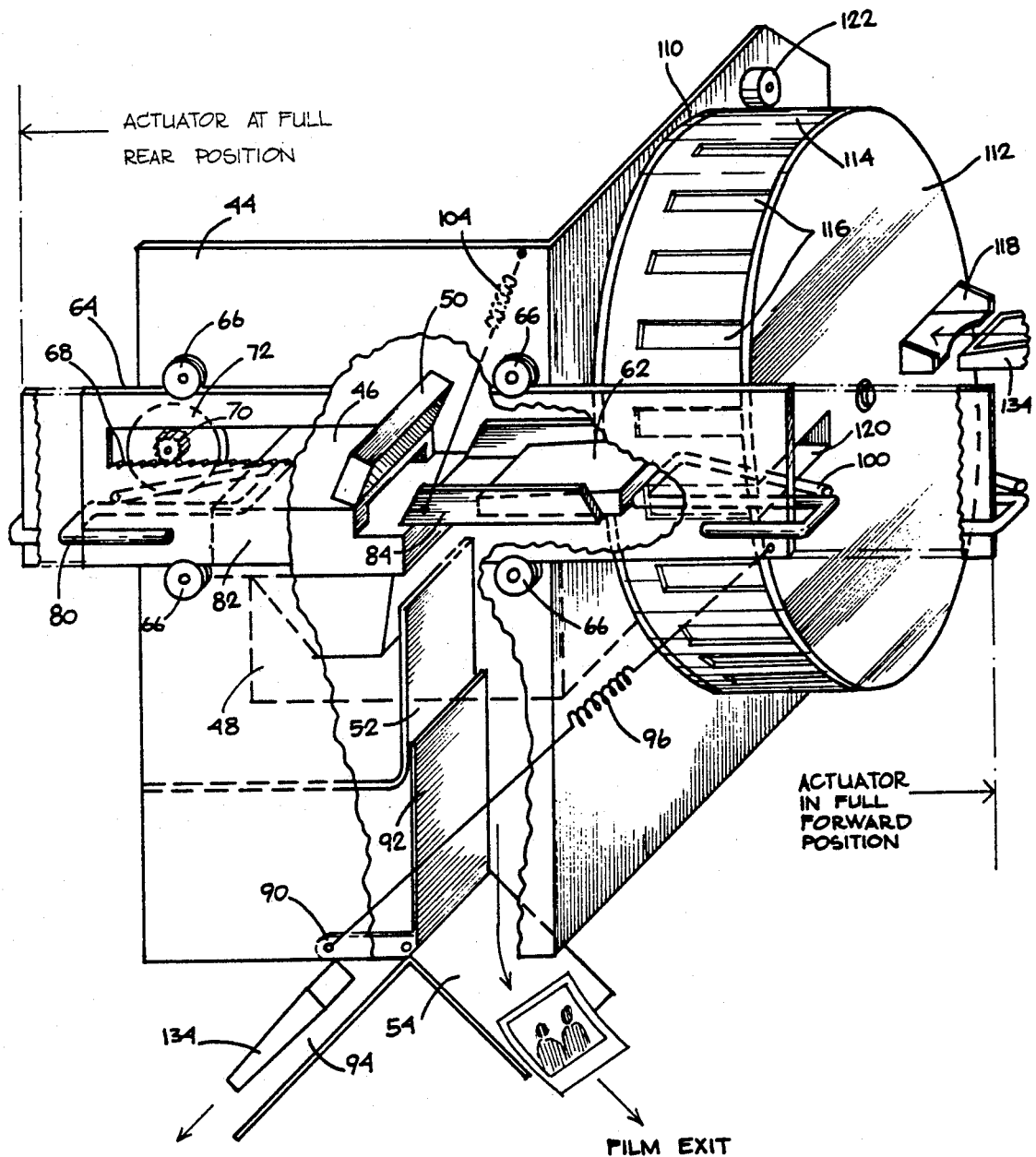
FIG. 3 is an enlarged, detailed schematic axonometric view with parts removed of the automatic film changing system of this invention.

Automatic film changing system 40 is shown enlarged and in greater detail in FIG. 3. System 40, FIG. 3, supports a camera-back 46 which uses a film cassette, typically holding ten photographic films. Camera back 46 interfaces directly with a freeze frame video unit 48, which captures an image from video camera 18 and upon command submits that image to a film in camera-back 46. Camera back 46 may be a conventional Polaroid camera-back using conventional ten-film Polaroid automatic film cassettes. Camera back 46 is modified: part of back side 82 is removed for movement of ejection element 80 and solenoid 130 is attached to the top surface.

In normal operation the camera-back's door 50, shown open in FIG. 3, is closed, and each time the film is exposed and begins to develop it is ejected in the normal fashion so that it falls into bifurcated dispensing path 52, where it drops into the photo conduit 54 and then on to tray 16, FIG. 1. Alternatively, film can move from conduit 54 to conveyor and then to tray 16, if the level of camera back 46 is lower or the same as tray 16. Cassette reloader unit 60 drives out a spent cassette after the ten films have been exhausted and inserts a new fresh cassette 62. Cassette reloader unit 60 includes reloader actuator 64, which is mounted for slidable movement in four idler pulleys 66. A rack 68 in actuator 64 is driven by pinion 70 operated by motor 72 mounted on frame 44 to move cassette reloader unit 60 in its cassette ejection cycle and replacement cycle. The ejection cycle takes place when motor 72 is energized to drive actuator 64 to the right so that ejection element 80 enters the side 82 of camera-back 46 and drives out the spent cassette while door 50 is open as shown in FIG. 3. At this time, cassette guide 84 is in the phantom position, not the full line position in FIG. 3. With guide 84 retracted out of the way, the cassette driven out of camera-back 46 simply drops down bifurcated dispensing path 52. As actuator 64 moves to the right during the ejection cycle, it draws link 90 in the clockwise direction, thereby swinging steering element 92 in the clockwise direction as well, momentarily shutting off photo conduit 54 and opening cassette conduit 94. Link 90 is interconnected with actuator element 64 by means of spring 96. At the end of the ejection extension, motor 72 reverses direction and drives actuator 64 in the opposite direction to the left in FIG. 3. This causes the replacement element 100 to drive a fresh cassette from film magazine 102 across guide 84, which is now in the extended position, and directly into camera-back 46 while door 50 is still open. Actuator 64 then moves to the right, returning to the neutral position, so that element 100 is clear of magazine 102 and ejection element 80 is clear of camera-back 46. Guide 84 is normally held up in the retracted position by spring 104 and is momentarily driven down to the extended position shown in FIG. 3 by the weight of a new cassette and as new cassette is driven toward camera back 46 by replacement element 100.

Magazine 102 includes two stationary disks, a rear disk 110 and a front disk 112, between which is rotatable member 114 which includes a plurality of bays 116, for example twenty, which can be loaded with fresh cassettes through loading tray 118. Magazine 102 presents a fresh cassette for loading into camera-back 46 at feeder slot 120 which accommodates replacement element 100. When actuator 64 is at the full ejection cycle extension and replacement element 100 is at its extreme right position clear of slot 120, wheel 114 is indexed by one bay by solenoid 122 mounted in frame 44 to bring the next bay with a fresh cassette into alignment with slot 120.

Figure 4:
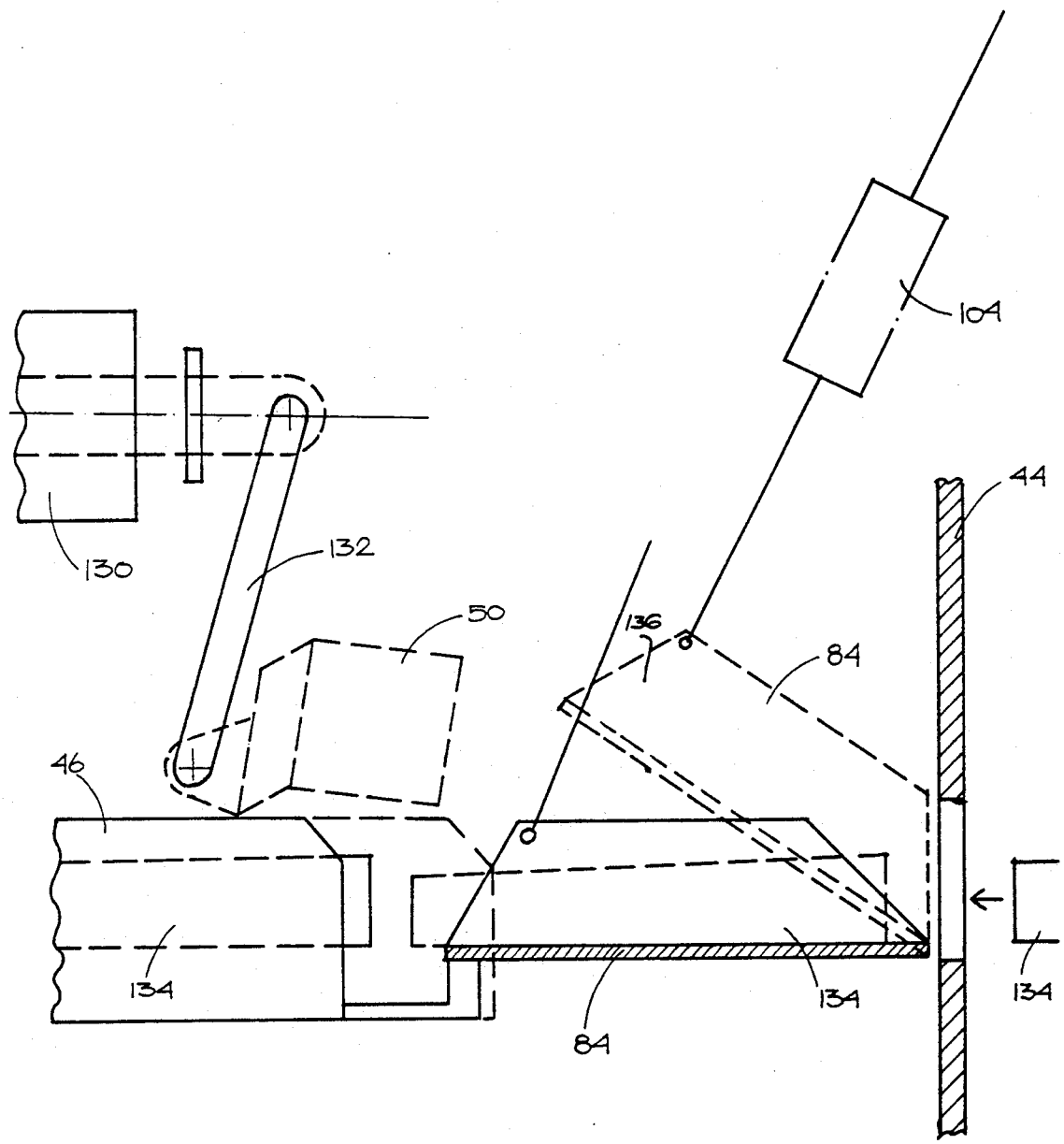
FIG. 4 is an enlarged, more detailed view of the camera-back door operating apparatus and film cassette guide of the automatic film changing system of FIG. 3.

Camera-back door 50, FIG. 3, is operated by solenoid 130, FIG. 4, through link 132. Cassette guide 84 is rotatably mounted to frame 44 at pivot 132, and normally remains in the retracted position as shown in phantom in FIG. 4 under the very light urging of spring 104. The weight of the fresh cassette 134 and the force applied by replacement element 100 is sufficient as film cassette 134 engages the inclined surface 136 of guide 84 to drive guide 84 down to the extended position against the light force of spring 104 so that cassette 134 is guided directly into camera-back 46.

Figure 5:
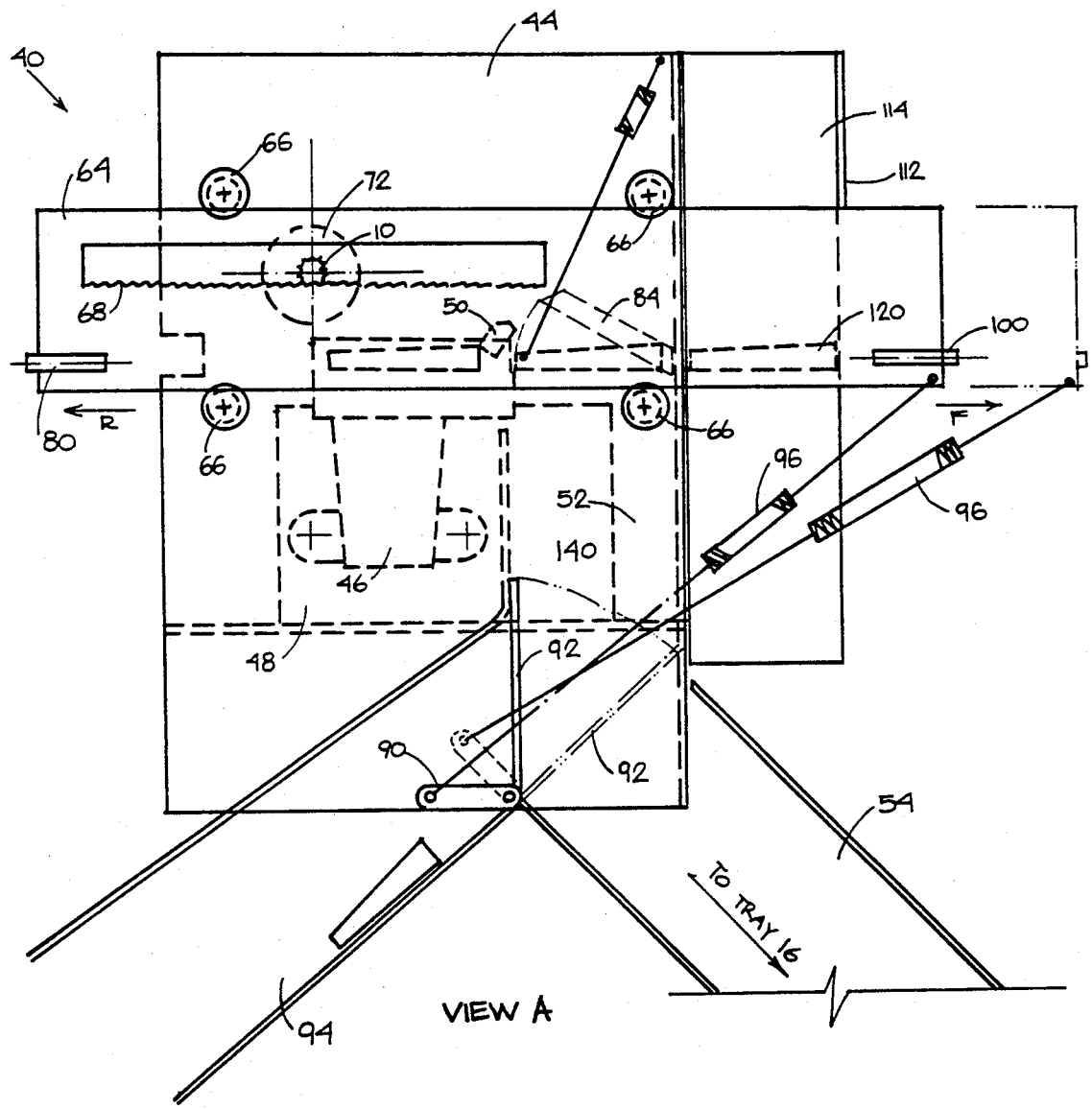
FIG. 5 is a schematic front elevational view with portions removed of the automatic film changing system of FIG. 3.
Figure 6:
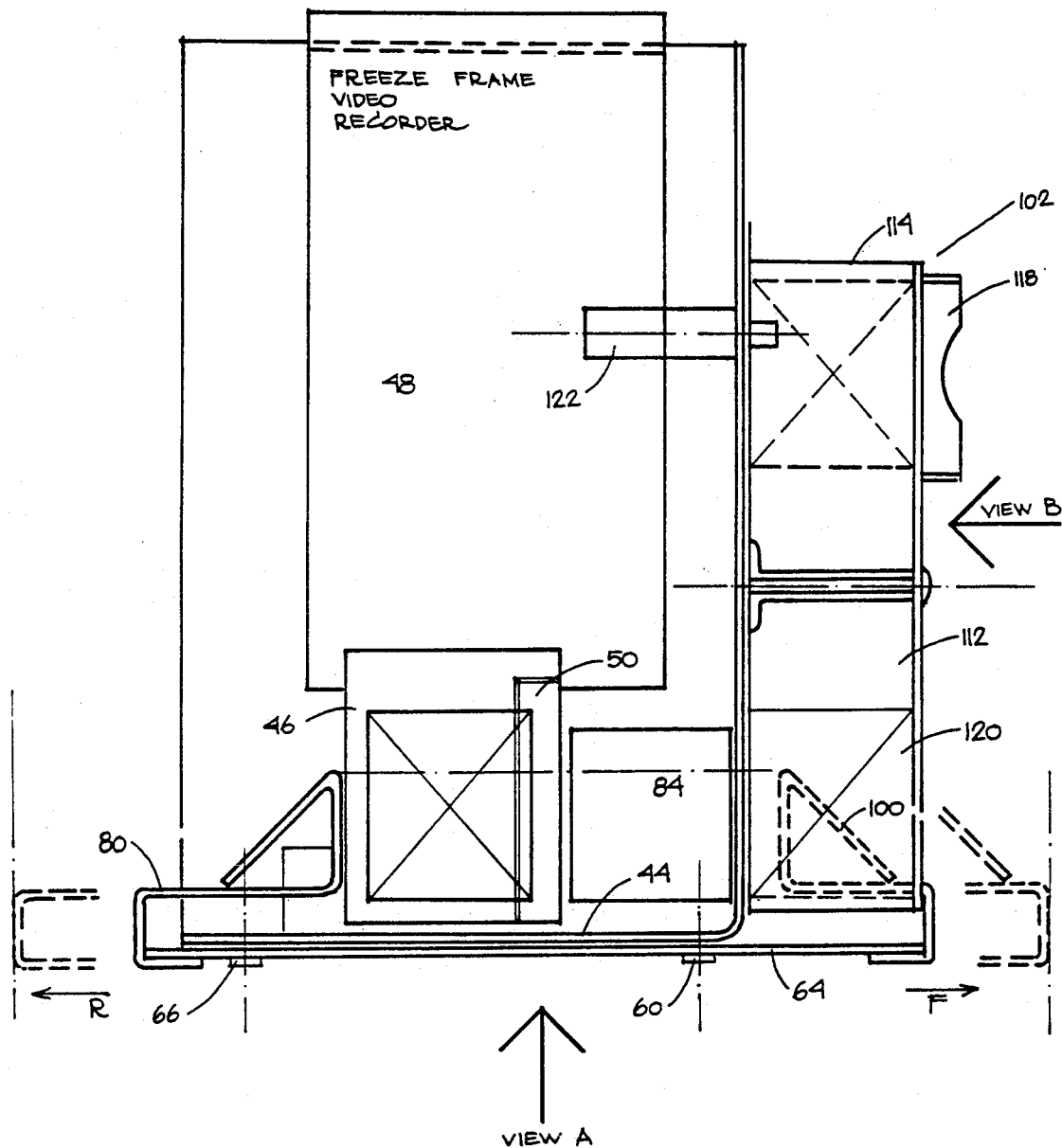
FIG. 6 is a schematic top plan view of the automatic film changing system of FIG. 3 with the cassette reloader unit in the neutral position

The construction of bifurcated path 52 can be seen more clearly in FIG. 5. In the full line depiction link 90 positions steering element 92 to cut off cassette conduit 94 from common conduit 140 and permits communication from common conduit 140 to photo conduit 54 to direct finished photographs to the customer at tray 16. In dashed lines in FIG. 5, link 90 positions steering element 92 to cut off communication from common conduit 140 to photo conduit 54, and instead to establish communication from common conduit 140 to cassette conduit 94, so that ejected spent cassettes driven out of camera-back 46 by ejection element 80 will drop down through common conduit 140 and be discharged out through cassette conduit 94. Cassette reloader 60 can be seen more clearly in FIG. 6, where camera-back door 50 is closed, guide 84 is in the up or retracted position, and actuator 64 is in the neutral position with ejection element 80 clear of camera-back 46 and replacement element 100 disposed in slot 120, ready to begin an ejection cycle.

Figure 7:
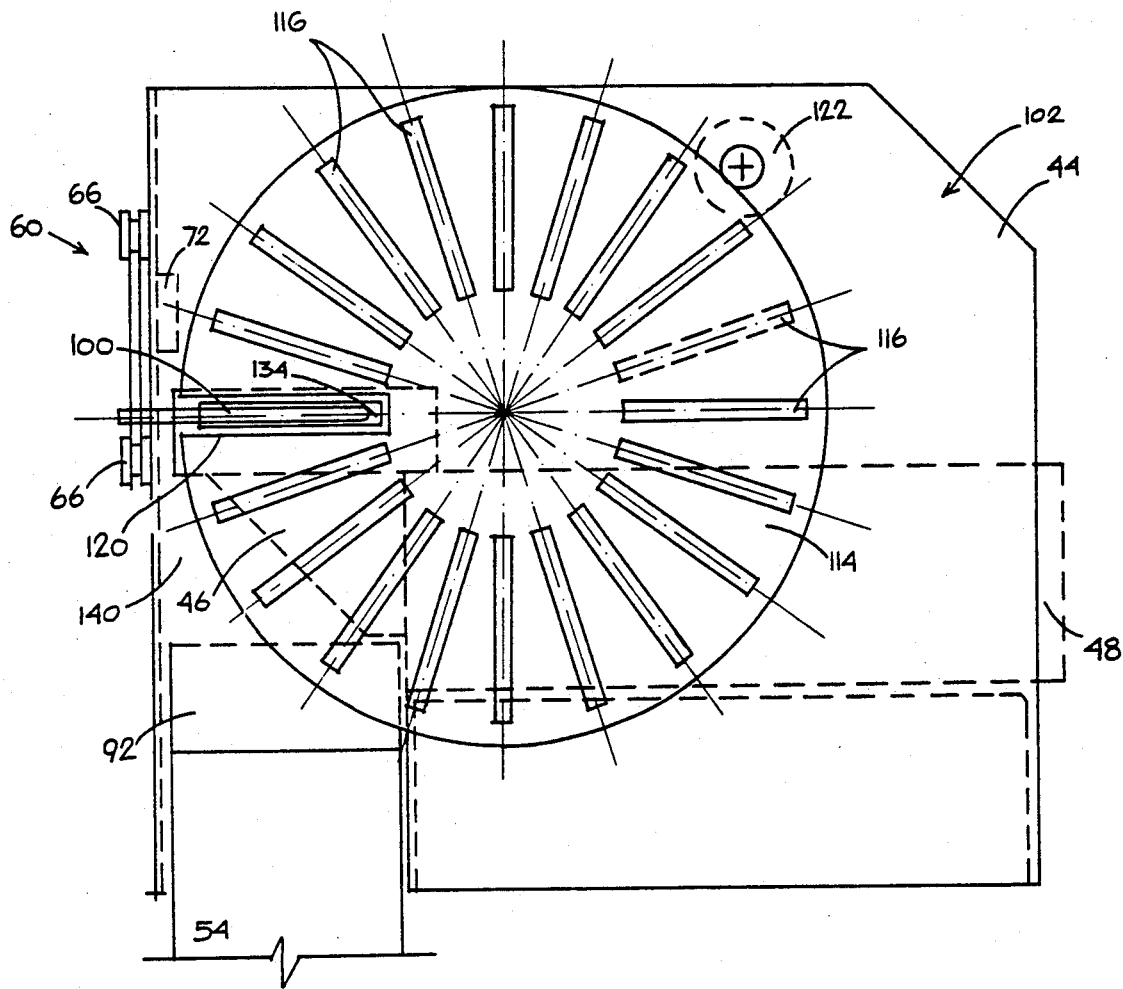
FIG. 7 is a side elevational view of the automatic film changing system of FIG. 3.

The full twenty bays 116 containing fresh cassettes 134 can be seen more readily in FIG. 7, where replacement element 100 is poised to drive a fresh cassette 134 across guide 84 for reloading into camera-back 46.

Figure 8:
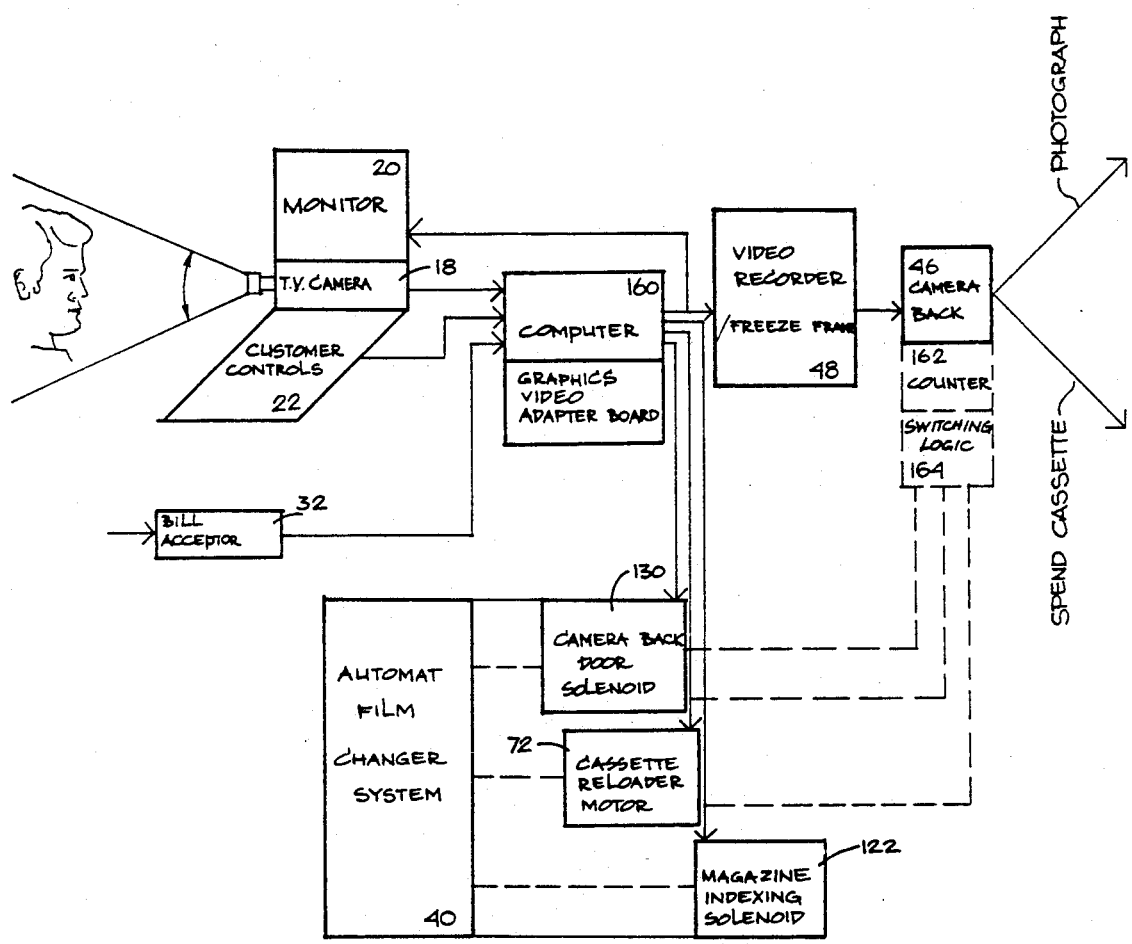
FIG. 8 is a block diagram of an automatic T.V. photographic system such as depicted by the booth in FIGS. 1 and 2 utilizing the automatic film changing system according to this invention.

Motor solenoid 122 is driven to index wheel 114 in steps of 18° to sequentially supply fresh cassettes at slot 120. A computer 160, FIG. 8, may be used to provide the background scene, manipulate the image, select the portrait, operate the freeze frame unit 48, and control the camera-back door solenoid 130, cassette reloader motor 72 and magazine indexing motor solenoid 122. The computer may be an "IBM AT-286" or equivalent. Alternatively, a simple counter 162 may be used to count the number of films dispensed by camera-back 46. Alternatively, the computer counter could be used. When the number ten is reached switching logic 164 initiates the cassette reloader operation ejection cycle and replacement cycle.

Figure 9:
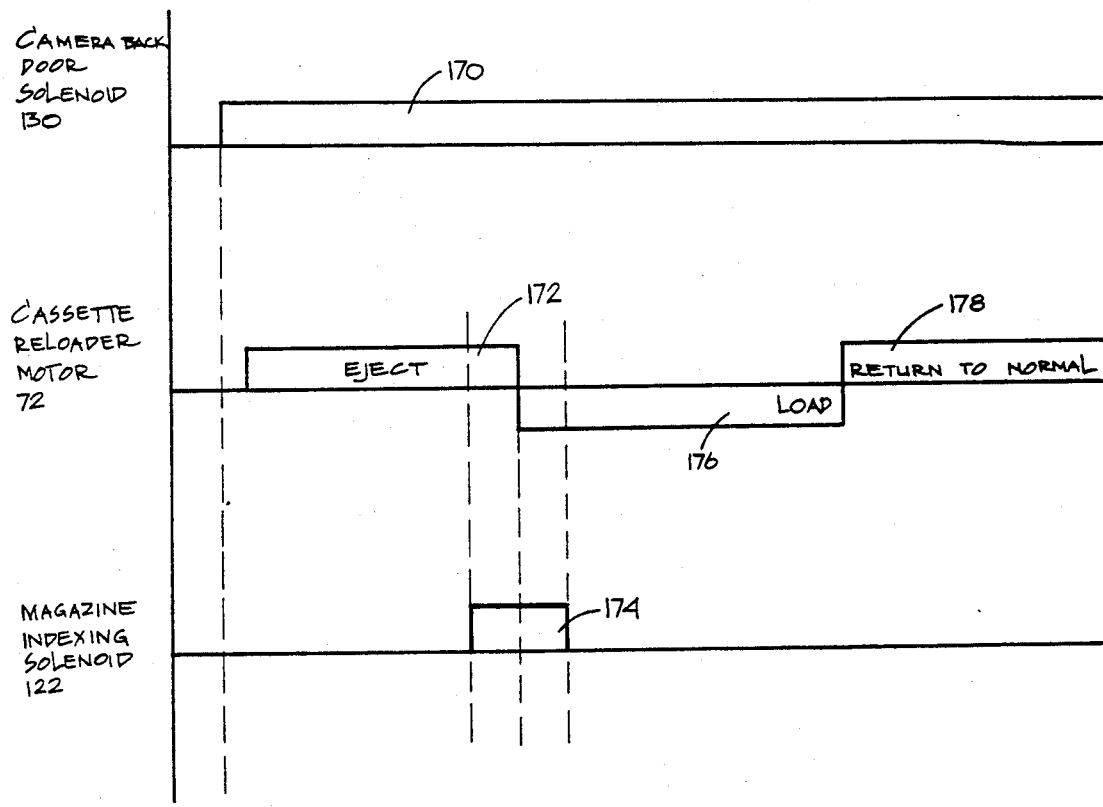
FIG. 9 is a graphical depiction of the operating signals for the camera-back door solenoid, cassette reloader motor, and magazine indexing solenoid.

Basically, when there is an indication from whatever source that the last film has been used, the camera-back door solenoid 130 is actuated by a signal 170, FIG. 9. Soon afterward, cassette reloader motor 72 is energized 172 to drive actuator 64 to the right and eject the cassette at the end of the ejection cycle. When replacement element 100 moves to the right it clears slot 120 and magazine indexing solenoid 122 is energized by signal 174 to step 18° and present a fresh cassette to slot 120. Meanwhile, actuator 64 has reached its extreme in the ejection cycle and has reversed direction 176 and begun to move to the left in the replacement cycle. By the time replacement element 100 begins to enter slot 120, the indexing of wheel 114 has ended, the fresh cassette is in position, and replacement element 100 drives it to the left over guide 84 and into camera-back 46. Subsequently cassette reloader motor 72 reverses direction once again under control of signal 178 and returns to the neutral position shown in FIG. 6.

The sequence of operation of the automatic film changing system 40 is shown schematically in FIGS. 10-17. Initially, FIG. 10, when cassette 134 is spent, door 50 is opened, guide 84 is in the "up" or retracted position, and steering element 92 is in its normal position, cutting off common conduit 140 from cassette discharge conduit 94 and facilitating access from conduit 140 to photo conduit 54. Next, in FIG. 11, cassette reloader unit 60 is operated so that actuator 64 moves to the right, causing ejection element 80 to enter camera 46 and eject cassette 134 into common conduit 140, where it encounters steering element 92 that redirects it into the cassette discharge conduit 94. Replacement element 100 has now been driven clear of slot 120 in magazine 102. Thus in FIG. 12, rotatable member 114 can be rotated 18° to place a fresh cassette 134 in slot 120. Steering element 92, which has been placed in the position shown in FIG. 11 by the movement of actuator 64 to the far right extreme of the ejection cycle, remains there in FIG. 12. Next, in FIG. 13, as actuator 64 is driven to the left, replacement element 100 enters slot 120 and pushes cassette 134 to the left, forcing guide 84 down and permitting cassette 134 to enter camera-back 46 through the still-open door 50. Simultaneously, as actuator 64 moves to the left, steering element 92 is permitted to return to its normal condition, where it blocks cassette conduit 94 and opens photo conduit 54. Actuator 60 continues moving to the full extent of the replacement cycle, where replacement element 100 has fully inserted cassette 134 into camera-back 46 and replacement element itself 100 rests over a guide 84, FIG. 14. Actuator 64 is once again driven back to the right to the neutral position, where ejection element 80 is clear of camera-back 46 and ejection element 100 is in slot 120 and clear of guide 84, FIG. 15. With no pressure on it from either a cassette or replacement element 100, guide 84 rises under the influence of spring 104, FIG. 16. Finally, solenoid 130 is actuated in FIG. 17 to close camera-back door 50, and the sequence is complete.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automatic film changing system for a camera-back which uses a film cassette comprising:
   a film magazine for storing a plurality of new cassettes of fresh film and presenting a fresh film cassette to replace a spent film cassette in the camera-back;
   means for detecting when the film cassette in the camera-back is spent;
   means, responsive to said detecting means, for enabling access to the film cassette in the camera-back when the cassette is spent;
   cassette reloader means, responsive to said detecting means, for ejecting a spent cassette from the camera-back and for loading a fresh cassette in the camera-back from said magazine; and
   a bifurcated dispensing path for normally directing finished photographs in one direction and periodically, selectively directing a spent cassette ejected from the camera-back in a second direction.

2. The automatic film changing system of claim 1 in which said film magazine includes a rotary housing with a plurality of circumferentially spaced cassette bays and means for indexing said rotary housing to replace an empty bay proximate said camera-back with a full bay.

3. The automatic film changing system of claim 1 in which said bifurcated dispensing path includes a common conduit associated with said camera-back and two exit conduits, a photo conduit for conducting finished photographs to a photograph pick up location and a cassette conduit for discharging spent cassettes and a steering element for selectively closing one of said exit conduits and opening the other.

4. The automatic film changing system of claim 1 in which said cassette reloader means includes a reloader actuator having an ejection element and a replacement element, and means for driving said actuator in a first direction during the ejection cycle to enable said ejection element to slide a spent cassette out of the camera-back and into said bifurcated path and in a second direction during the replacement cycle to enable said replacement element to slide a fresh cassette out of said magazine and into the camera-back.

5. The automatic film changing system of claim 3 in which said cassette reloader means includes a reloader actuator having an ejection element and a replacement element, and means for driving said actuator in a first direction during the ejection cycle to enable said ejection element to move a spent cassette out of the camera-back and into said bifurcated path and in a second direction during the replacement cycle to enable said replacement element to move a fresh cassette out of said magazine and into the camera-back.

6. The automatic film changing system of claim 5 in which said cassette reloader means further includes means for operating said steering element for momentarily opening said cassette conduit and closing said photo conduit during said ejection cycle and for restoring said steering element to close said cassette conduit and open said photo conduit during and after said replacement cycle.

7. The automatic film changing system of claim 1 in which said cassette reloader means includes cassette guide means for guiding a fresh cassette from said magazine to the camera-back.

8. The automatic film changing system of claim 4 in which said cassette reloader means includes cassette guide means for guiding a fresh cassette from said magazine to the camera-back.

9. The automatic film changing system of claim 8 in which said guide means is resiliently, pivotably mounted proximate said magazine for normally remaining in a retracted position and for lowering into an extended position between the camera-back and said magazine.

* * * * *